(12) United States Patent
Liu et al.

(10) Patent No.: US 8,385,054 B2
(45) Date of Patent: Feb. 26, 2013

(54) SUPPORT STRUCTURE, SUPPORT MECHANISM AND COMPUTER APPARATUS USING THE SAME

(75) Inventors: Chun-Cheng Liu, New Taipei (TW); Jen-Chieh Cheng, New Taipei (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 148 days.

(21) Appl. No.: 13/161,463

(22) Filed: Jun. 15, 2011

(65) Prior Publication Data
US 2012/0293931 A1 Nov. 22, 2012

(30) Foreign Application Priority Data
May 20, 2011 (TW) .................................. 100117745

(51) Int. Cl.
*H05K 5/00* (2006.01)
*H05K 7/00* (2006.01)

(52) U.S. Cl. ......... 361/679.02; 361/679.21; 361/679.22; 361/679.23; 361/679.24; 361/679.25; 361/679.26

(58) Field of Classification Search ............. 361/679.02, 361/679.21, 679.22, 679.23, 679.24, 679.25, 361/679.26
See application file for complete search history.

(56) References Cited

U.S. PATENT DOCUMENTS

| | | | | | |
|---|---|---|---|---|---|
| 5,035,393 | A | * | 7/1991 | Menaged ....................... | 248/456 |
| 5,633,782 | A | * | 5/1997 | Goodman et al. ........ | 361/679.41 |
| 5,899,421 | A | * | 5/1999 | Silverman ..................... | 248/175 |
| 5,915,661 | A | * | 6/1999 | Silverman et al. ......... | 248/465.1 |
| 6,807,050 | B1 | * | 10/2004 | Whitehorn et al. ...... | 361/679.23 |
| 2005/0121594 | A1 | * | 6/2005 | Kuo .............................. | 248/676 |

\* cited by examiner

*Primary Examiner* — Anthony Haughton
(74) *Attorney, Agent, or Firm* — Winston Hsu; Scott Margo

(57) ABSTRACT

A support structure for supporting a computer device includes a clamping frame, two clamping members, and a support rod. The clamping frame is used for clamping a side of the computer device. The two clamping members are disposed on the clamping frame. At least one of the two clamping members has at least one angle positioning bump. The support rod is disposed at a side of the clamping frame for supporting the clamping frame. The support rod includes an arm portion and a shaft portion. The arm portion has an angle positioning hole for engaging with the angle positioning bump to fix an angle of the arm portion relative to the clamping frame. The shaft portion is extendedly connected to an end of the arm portion and detachably disposed between the clamping members, for making the arm portion capable of rotating relative to the clamping frame.

18 Claims, 10 Drawing Sheets

SUPPORT STRUCTURE, SUPPORT MECHANISM AND COMPUTER APPARATUS USING THE SAME

BACKGROUND OF THE INVENTION

1. Field of the Invention

The present invention relates to a support structure, and more specifically, to a support structure for supporting a computer device.

2. Description of the Prior Art

In recent years, a portable computer, such as a tablet computer, is wildly used in daily life. Since the portable computer is convenient for a user to carry, it has replaced a desktop computer to become the main tool for performing digital operations (e.g. processing paperwork or browsing Internet).

In general, a user needs to directly hold a portable computer (e.g. a tablet computer) by hand for performing digital operations. When the user wants to put the portable computer on a table for using over a long time, the prior art usually utilizes an external support frame to support the portable computer. However, the said external support frame usually has a complicated structural design and is inconvenient in assembly and disassembly. Furthermore, since the said external support frame additionally needs to have a containing space formed thereon for containing the portable computer, it also has a larger volume so as to cause the user much inconvenience in carrying.

SUMMARY OF THE INVENTION

The present invention provides a support structure for supporting a computer device. The support structure includes a clamping frame, two clamping members, and a support rod. The clamping frame is used for clamping a side of the computer device. The two clamping members are disposed on the clamping frame. At least one of the two clamping members has at least one angle positioning bump. The support rod is disposed at a side of the clamping frame for supporting the clamping frame. The support rod includes an arm portion and a shaft portion. The arm portion has an angle positioning hole for engaging with the angle positioning bump to fix an angle of the arm portion relative to the clamping frame. The shaft portion is extendedly connected to an end of the arm portion and detachably disposed between the clamping members, for making the arm portion capable of rotating relative to the clamping frame.

The present invention further provides a support mechanism for supporting a computer device. The support mechanism includes a first support structure, a second support structure, and a telescopic rod. The first support structure includes a first clamping frame, two first clamping members, and a first support rod. The first clamping frame is used for clamping a first side of the computer device. The two first clamping members are disposed on the first clamping frame. At least one of the two first clamping members has at least one first angle positioning bump. The first support rod is disposed at a side of the first clamping frame for supporting the first clamping frame. The first support rod includes a first arm portion and a first shaft portion. The first arm portion has a first angle positioning hole for engaging with the first angle positioning bump. The first shaft portion is detachably disposed between the first clamping members. The second support structure includes a second clamping frame, two second clamping members, and a second support rod. The second clamping frame is used for clamping a second side of the computer device. The two second clamping members are disposed on the second clamping frame. At least one of the two second clamping members has at least one second angle positioning bump. The second support rod is disposed at a side of the second clamping frame for supporting the second clamping frame. The second support rod includes a second arm portion and a second shaft portion. The second arm portion has a second angle positioning hole for engaging with the second angle positioning bump. The second shaft portion is detachably disposed between the second clamping members. The telescopic rod is telescopically connected to the first support structure and the second support structure, for adjusting a position of the first support structure relative to the second support structure.

The present invention further provides a computer apparatus. The computer apparatus includes a computer device and a support structure. The support structure is used for supporting the computer device. The support structure includes a clamping frame, two clamping members, and a support rod. The clamping frame is used for clamping a side of the computer device. The two clamping members are disposed on the clamping frame. At least one of the two clamping members has at least one angle positioning bump. The support rod is disposed at a side of the clamping frame for supporting the clamping frame. The support rod includes an arm portion and a shaft portion. The arm portion has an angle positioning hole for engaging with the angle positioning bump to fix an angle of the arm portion relative to the clamping frame. The shaft portion is extendedly connected to an end of the arm portion and detachably disposed between the clamping members, for making the arm portion capable of rotating relative to the clamping frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
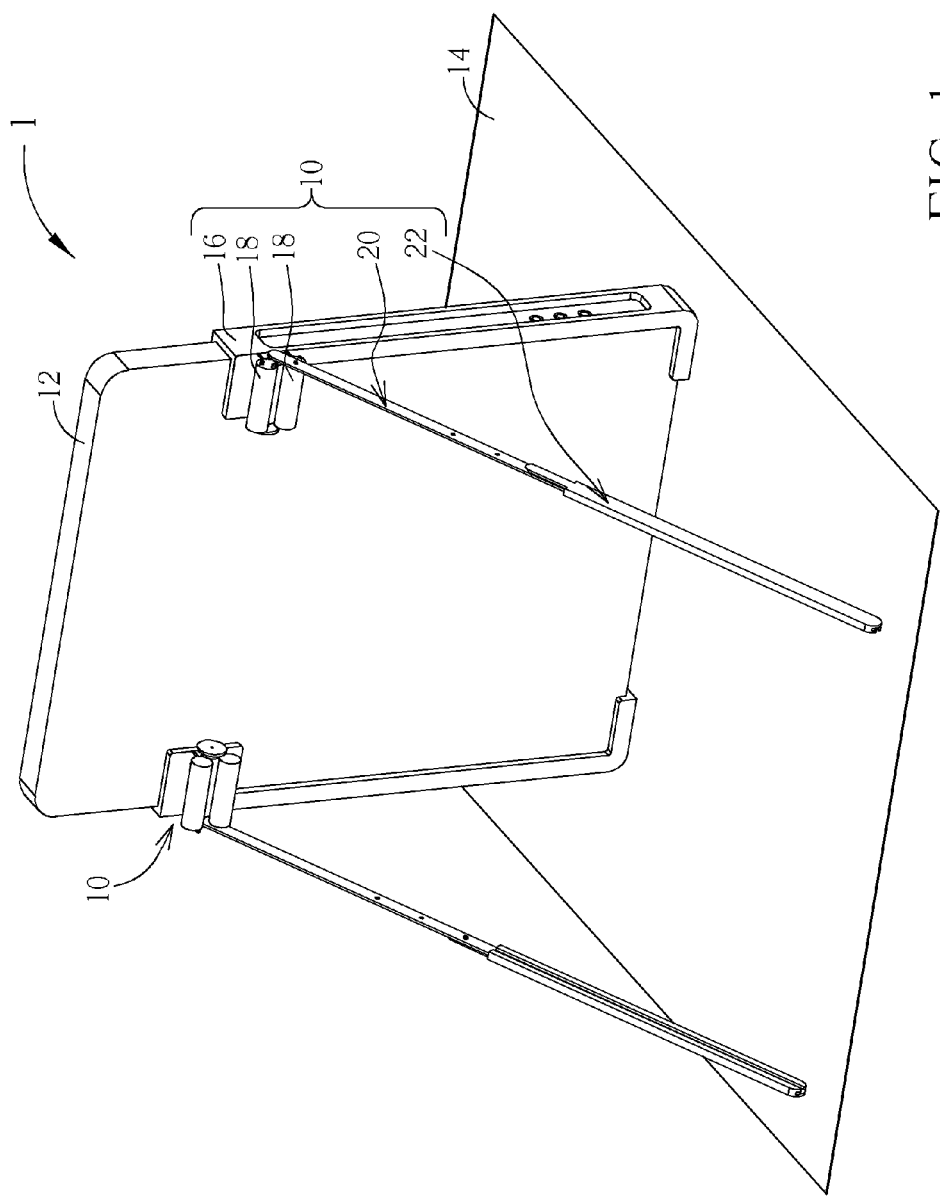
FIG. 1 is a diagram of a computer apparatus according to a first embodiment of the present invention.

Please refer to FIG. 1, which is a diagram of a computer apparatus 1 according to a first embodiment of the present invention. As shown in FIG. 1, the computer apparatus 1 includes two support structures 10 and a computer device 12. The support structures 10 clamp the left and right sides of the computer device 12 respectively for supporting the computer device 12 on a holding surface 14, so that a user can operate the computer device 12 without holding the computer device 12 by hand. In this embodiment, the computer device 12 is preferably a tablet computer, but is not limited thereto.

Figure 2:
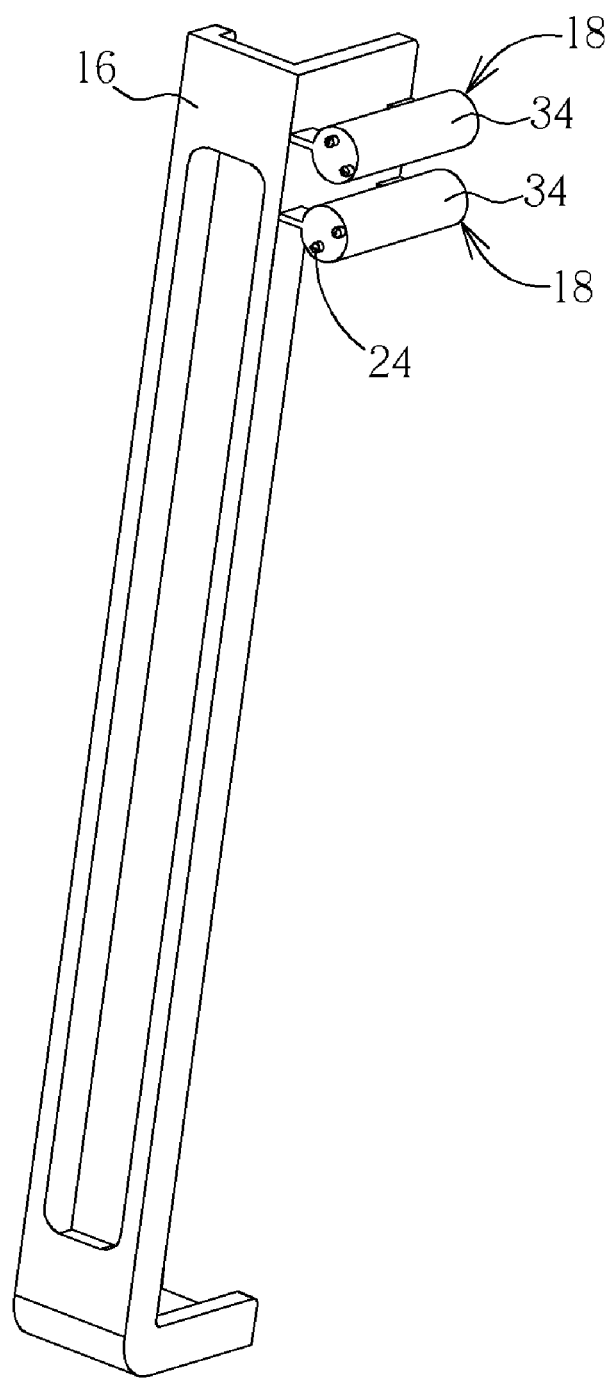
FIG. 2 is an enlarged diagram of a clamping frame and clamping members in FIG. 1.
Figure 3:
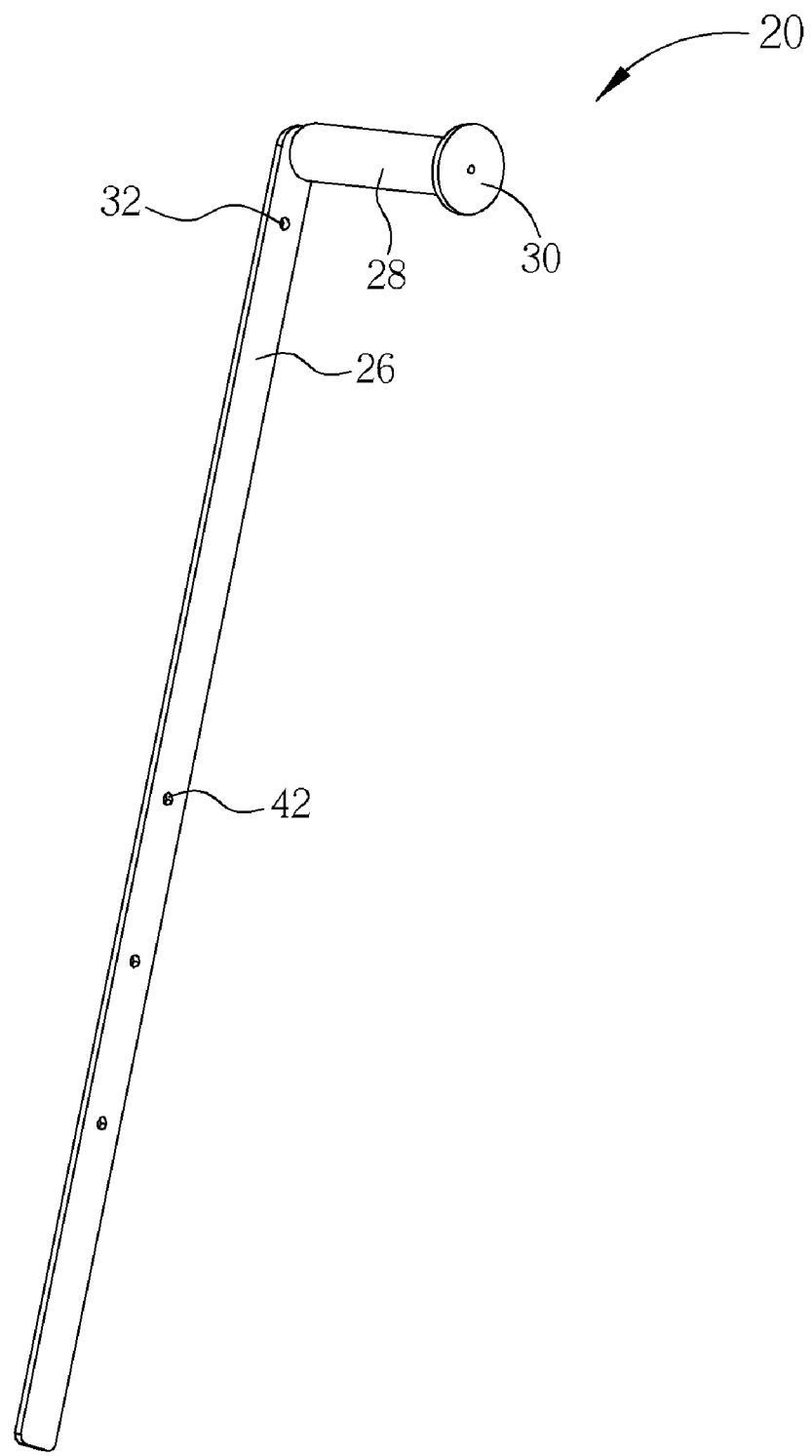
FIG. 3 is an enlarged diagram of a support rod in FIG. 1.
Figure 4:
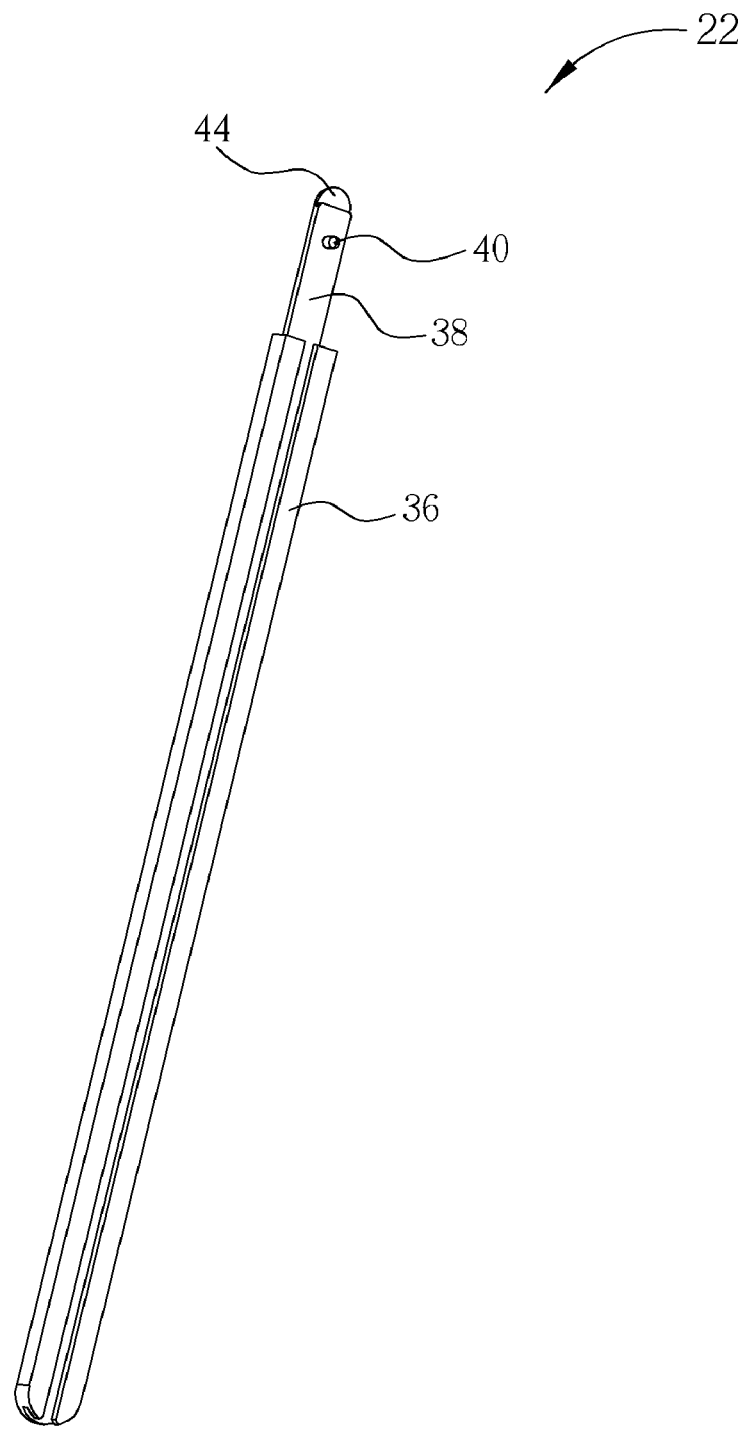
FIG. 4 is an enlarged diagram of a slot member in FIG. 1.

More detailed description for the structural design of the support structure 10 located at the right side of the computer device 12 in FIG. 1 is provided as follows. As for description for the structural design of the support structure 10 located at the left side of the computer device 12, it can be reasoned by analogy and therefore omitted herein. As shown in FIG. 1, the support structure 10 includes a clamping frame 16, two clamping members 18, a support rod 20, and a slot member 22. Please refer to FIG. 2, FIG. 3, and FIG. 4. FIG. 2 is an enlarged diagram of the clamping frame 16 and the clamping members 18 in FIG. 1. FIG. 3 is an enlarged diagram of the support rod 20 in FIG. 1. FIG. 4 is an enlarged diagram of the slot member 22 in FIG. 1. As shown in FIG. 1, FIG. 2, and FIG. 3, the clamping frame 16 is used for clamping a side of the computer device 12. The two clamping members 18 are disposed on the clamping frame 16, and at least one of the two clamping members 18 has at least one angle positioning bump 24 (two respectively shown on each clamping member 18 in FIG. 2). The clamping members 18 are integrally formed on the clamping frame 16 in this embodiment. The support rod 20 is disposed at a side of the clamping frame 16 for supporting the clamping frame 16. The support rod 20 includes an arm portion 26, a shaft portion 28, and a limiting portion 30. In this embodiment, the arm portion 26 is integrally formed with the shaft portion 28 and the limiting portion 30. The arm portion 26 has an angle positioning hole 32 for engaging with the angle positioning bump 24 to fix an angle of the arm portion 26 relative to the clamping frame 16. The shaft portion 28 is extendedly connected to an end of the arm portion 26 and detachably disposed between the two clamping members 18, so that the arm portion 26 can rotate relative to the clamping frame 16. In this embodiment, each clamping member 18 has a cylindrical portion 34 for clamping the shaft portion 28. Via the design of the clamping members 18, the shaft portion 28 can not only be clamped between the two clamping members 18 firmly, but can also rotate relative to the clamping frame 16 smoothly. Furthermore, in this embodiment, the angle positioning bump 24 is formed at a side of the cylindrical portion 34 corresponding to the arm portion 26. The limiting portion 30 is connected to an end of the shaft portion 28. The limiting portion 30 is preferably a circular sheet structure for preventing the shaft portion 28 from dropping off the two clamping members 18. In practical application, the width of the shaft portion 28 is greater than the width of each clamping member 18. In such a manner, the shaft portion 28 can move leftward and rightward relative to the clamping member 18, so as to achieve the purpose that the angle positioning hole 32 can be selectively engaged with or separate from the angle positioning bump 24.

Furthermore, as shown in FIG. 3 and FIG. 4, the slot member 22 has a slot portion 36 and an engaging portion 38. The arm portion 26 is slidably disposed in the slot portion 36 for achieving the purpose that the arm portion 26 and the slot portion 36 can slide relatively to adjust the overall length of the support rod 20 and the slot member 22. The engaging portion 38 is connected to an end of the slot portion 36 and has a length positioning bump 40. The arm portion 26 further has at least one length positioning hole 42 (three shown in FIG. 3.). The length positioning bump 40 is used for engaging with the length positioning hole 42 to fix a length of the slot portion 36 relative to the arm portion 26. Furthermore, the slot member 22 further has a pulling portion 44 formed at an end of the engaging portion 38. Accordingly, a user can pull the pulling portion 44 to drive the length positioning bump 40 to be separate from the length positioning hole 42.

Figure 5:
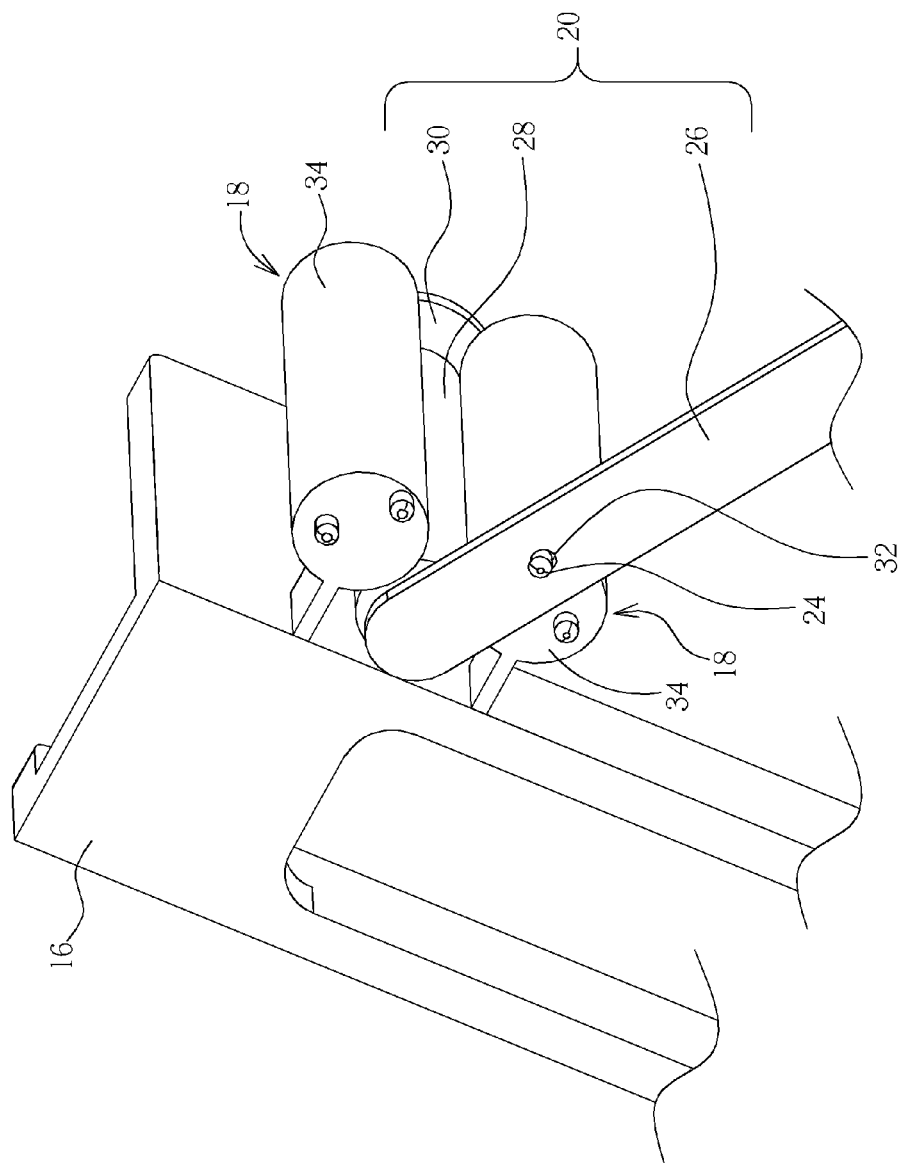
FIG. 5 is an enlarged diagram of a shaft portion of a support rod in FIG. 3 being disposed between the clamping members.
Figure 6:
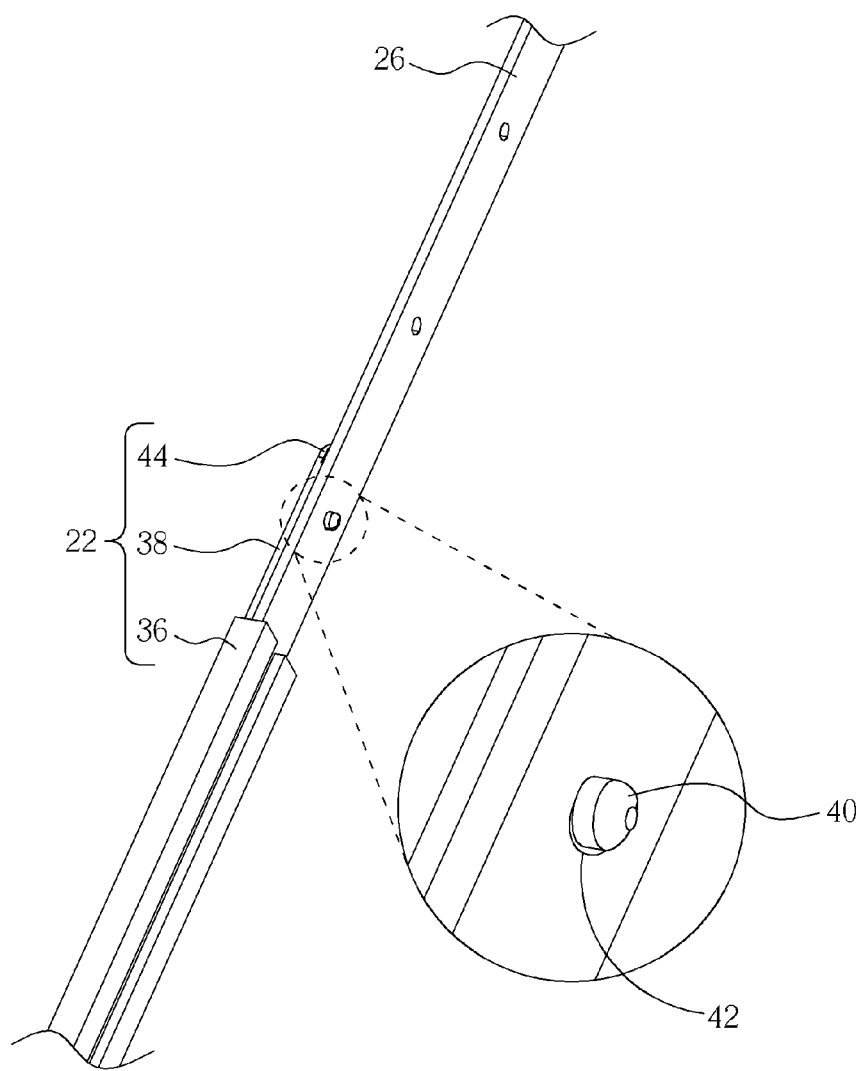
FIG. 6 is an enlarged diagram of a length positioning bump of an engaging portion in FIG. 4 being engaged with a length positioning hole of an arm portion.

In the following, the support operation of the computer apparatus 1 is described in detail. Please refer to FIG. 1, FIG. 5, and FIG. 6. FIG. 5 is an enlarged diagram of the shaft portion 28 of the support rod 20 in FIG. 3 being disposed between the clamping members 18. FIG. 6 is an enlarged diagram of the length positioning bump 40 of the engaging portion 38 in FIG. 4 being engaged with the length positioning hole 42 of the arm portion 26. When a user wants to support the computer device 12 on the holding surface 14 for performing digital operations, the user just needs to utilize the clamping frames 16 to respectively clamp the left and right sides of the computer device 12, and then engages the shaft portion 28 of the support rod 20 into the two cylindrical portions 34 of the clamping member 18. Finally, after the angle positioning hole 32 on the arm portion 26 is engaged with the angle positioning bump 24 (as shown in FIG. 5) selected by the user to fix an angle of the support rod 20 relative to the clamping frame 16 and then the length positioning bump 40 is engaged with the length positioning hole 42 (as shown in FIG. 6) selected by the user, the support operation of the computer apparatus 1 is completed accordingly so as to achieve the purpose that the computer device 12 is supported on the holding surface 14 by the support structures 10 (as shown in FIG. 1). Thus, the user can conveniently perform the subsequent digital operations, such as processing paperwork or browsing Internet.

Figure 7:
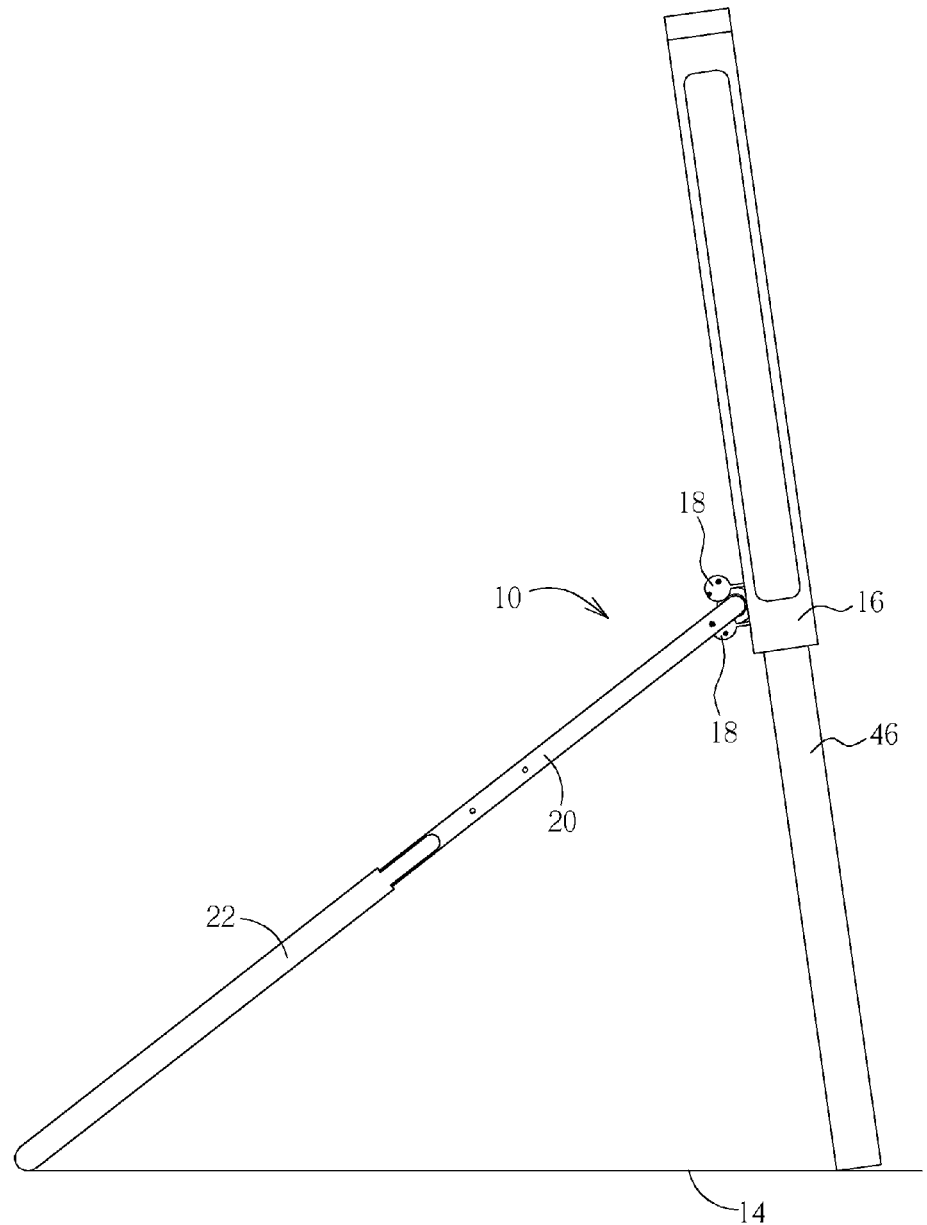
FIG. 7 is a side view of a support structure in FIG. 1 supporting a computer device.

If the user wants to adjust an angle of the support rod 20 relative to the clamping frame 16, the user just needs to pull the arm portion 26 to move outward relative to the clamping member 18 so as to make the angle positioning hole 32 separate from the angle positioning bump 24 in FIG. 5, and pull the arm portion 26 to take the shaft portion 28 as a pivot shaft and then rotate to a position corresponding to another angle positioning bump 24 relative to the clamping members 18. Finally, after the arm portion 26 is pushed inward relative to the clamping members 18 to make the angle positioning hole 32 engaged with the said angle positioning bump 24, an angle of the support rod 20 relative to the clamping frame 16 can be fixed again so as to achieve the purpose for adjusting an angle of the computer device 12 relative to the holding surface 14. To be noted, if a computer device is oversized and then is incapable of being supported on the holding surface 14 due to imbalance, the user just needs to rotate the arm portion 26 in FIG. 5 upward to make the angle positioning hole 32 engaged with another angle positioning bump 24 and then flip over the computer device. In such a manner, the computer device can be supported on the holding surface 14 by its bottom side abutting against the holding surface 14. The configuration of the support structure 10 and the said computer device can be as shown in FIG. 7, which is a side view of the support structure 10 in FIG. 1 supporting a computer device 46.

Furthermore, if the user wants to adjust a length of the arm portion 26 relative to the slot portion 36 to change an angle of the computer device 12 relative to the holding surface 14, the user just needs to pull the pull portion 44 outward relative to the arm portion 26 to make the length positioning hole 42 separate from the length positioning bump 40 in FIG. 6, and then pull the slot portion 36 to slide to a position where the length positioning bump 40 is engaged with another length positioning hole 42 relative to the arm portion 26. In such a manner, the length of the arm portion 26 relative to the slot portion 36 can be fixed again, so as to adjust an angle of the computer device 12 relative to the holding surface 14.

Figure 8:
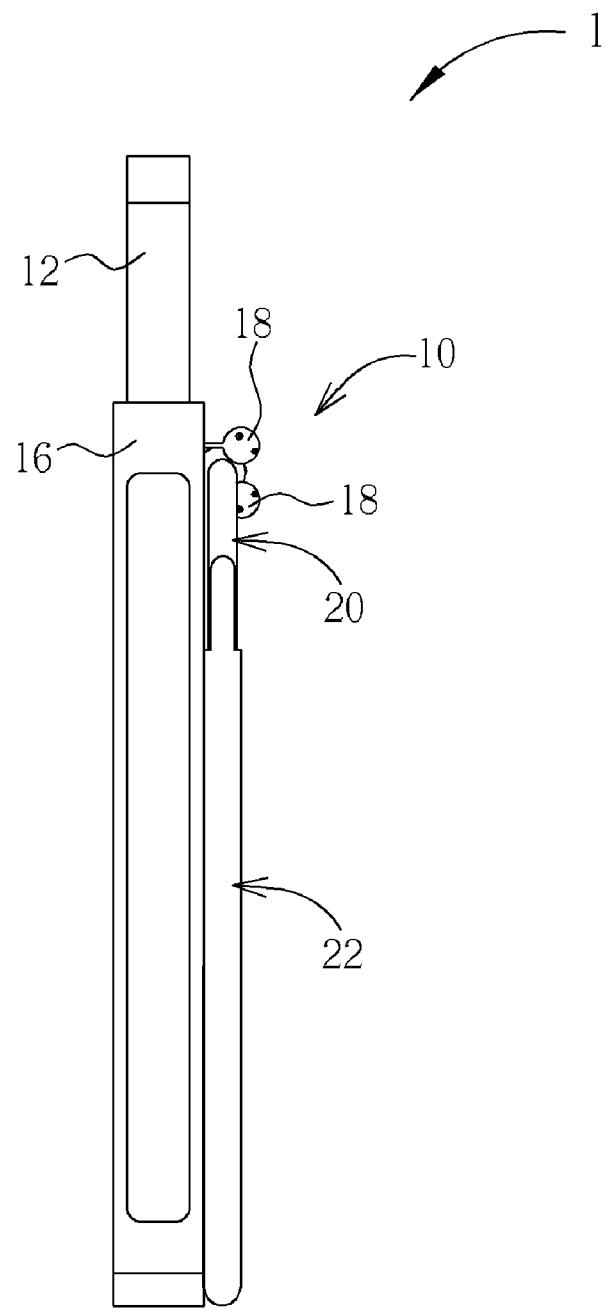
FIG. 8 is a side view of the support rod in FIG. 1 leaning against a side of the clamping frame.

On the other hand, if the user wants to carry the computer device 12, the user just needs to detach the clamping frame 16 from the two sides of the computer device 12 respectively, or rotate the support rod 20 to a position where the support rod 20 leans against a side of the clamping frame 16 and then push the support rod 20 into the slot member 22 (as shown in FIG. 8). Accordingly, it is convenient for the user to carry the computer apparatus 1.

Figure 9:
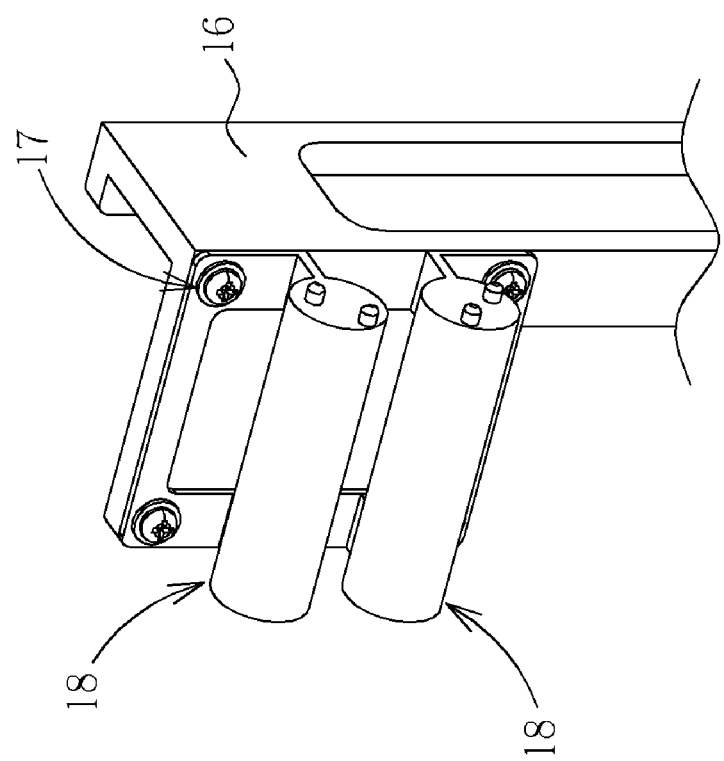
FIG. 9 is an enlarged diagram of the clamping members in FIG. 2 being screwed onto the clamping frame.

It should be mentioned that the design for utilizing the support structure 10 to support the computer device 12 is not limited to the said embodiment. For example, the computer apparatus 1 can only utilize one single support structure 10 to support one side of the computer device 12 for simplifying the assembly and disassembly processes of the computer apparatus 1. Furthermore, the clamping structural design on the clamping member 18 and the design for fixing the clamping member 18 onto the clamping frame 16 are not limited to the said embodiment. For example, please refer to FIG. 9, which is an enlarged diagram of the clamping members 18 in FIG. 2 being screwed onto the clamping frame 16. As shown in FIG. 9, the clamping members 18 are fixed onto the clamping frame 16 by screws 17. The clamping structural design on the clamping member 18 can also adopt other structure having the same clamping effect, such as a hook structure. Furthermore, the slot member 22 and the limiting portion 30 are omissible for simplifying the structural design of the support structure 10. For example, the support structure 10 can only utilize the support rod 20 to support the clamping frame 16 without the slot member 22.

Figure 10:
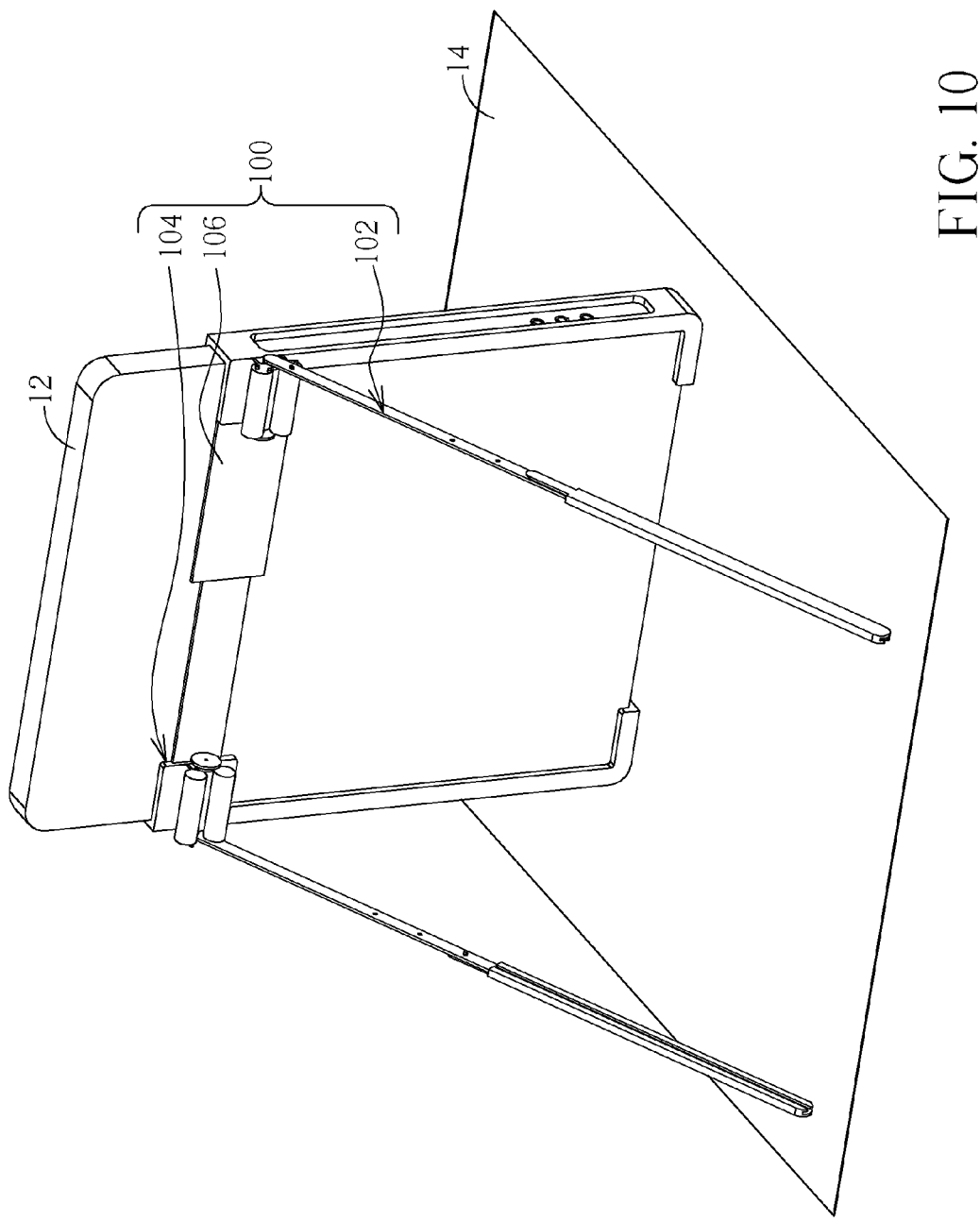
FIG. 10 is a diagram of a support mechanism supporting the computer device on a holding surface according to a second embodiment of the present invention.

Please refer to FIG. 10, which is a diagram of a support mechanism 100 supporting the computer device 12 on the holding surface 14 according to a second embodiment of the present invention. Components both mentioned in the second embodiment and the said embodiment represent components with similar functions or structures. The major difference between the support mechanism 100 and the support structure 10 is additional disposal of a telescopic rod. The support mechanism 100 includes a first support structure 102, a second support structure 104, and a telescopic rod 106. The structural designs of the first support structure 102 and the second support structure 104 are substantially the same as the structural design of the support structure 10, and the related description is omitted herein for simplicity. Only the structural design of the telescopic rod 106 is described as follows. As shown in FIG. 9. The telescopic rod 106 is telescopically connected to the first support structure 102 and the second support structure 104 for adjusting a position of the first support structure 102 relative to the second support structure 104. Accordingly, the purpose that the support mechanism 100 can clamp computer devices of different sizes can be achieved, so as to enhance flexibility of the support mechanism 100 in support operation. As for the telescopic design of the telescopic rod 106, its related description is omitted herein since it is commonly seen in the prior art.

Those skilled in the art will readily observe that numerous modifications and alterations of the device and method may be made while retaining the teachings of the invention.

What is claimed is:

1. A support structure for supporting a computer device, the support structure comprising:
   a clamping frame for clamping a side of the computer device;
   two clamping members disposed on the clamping frame, at least one of the two clamping members having at least one angle positioning bump; and
   a support rod disposed at a side of the clamping frame for supporting the clamping frame, the support rod comprising:
      an arm portion having an angle positioning hole for engaging with the angle positioning bump to fix an angle of the arm portion relative to the clamping frame; and
      a shaft portion extendedly connected to an end of the arm portion and detachably disposed between the clamping members, for making the arm portion capable of rotating relative to the clamping frame.

2. The support structure of claim 1, wherein each clamping member has a cylindrical portion for clamping the shaft portion, and the angle positioning bump is formed at a side of the cylindrical portion corresponding to the arm portion.

3. The support structure of claim 1, wherein the support rod further comprises:
   a limiting portion connected to an end of the shaft portion for preventing the shaft portion being separate from the clamping members.

4. The support structure of claim 1, wherein the arm portion further has at least one length positioning hole, and the support structure further comprises:
   a slot member having a slot portion and an engaging portion, the arm portion being slidably disposed in the slot portion, the engaging portion having a length positioning bump for engaging with the length positioning hole to fix a length of the slot member relative to the support rod.

5. The support structure of claim. 4, wherein the slot member further has a pull portion formed at an end of the engaging portion for driving the length positioning bump of the engaging portion to be separate from the length positioning hole when being pulled.

6. The support structure of claim 1, wherein the clamping members are fixed to the clamping frame by screws.

7. A support mechanism for supporting a computer device, the support mechanism comprising:
   a first support structure comprising:
      a first clamping frame for clamping a first side of the computer device;
      two first clamping members disposed on the first clamping frame, at least one of the two first clamping members having at least one first angle positioning bump; and
      a first support rod disposed at a side of the first clamping frame for supporting the first clamping frame, the first support rod comprising:
         a first arm portion having a first angle positioning hole for engaging with the first angle positioning bump; and
         a first shaft portion detachably disposed between the first clamping members;
   a second support structure comprising:
      a second clamping frame for clamping a second side of the computer device;
      two second clamping members disposed on the second clamping frame, at least one of the two second clamping members having at least one second angle positioning bump; and
      a second support rod disposed at a side of the second clamping frame for supporting the second clamping frame, the second support rod comprising:
         a second arm portion having a second angle positioning hole for engaging with the second angle positioning bump; and a second shaft portion detachably disposed between the second clamping members; and a telescopic rod telescopically connected to the first support structure and the second support structure, for adjusting a position of the first support structure relative to the second support structure.

8. The support mechanism of claim 7, wherein each first clamping member has a cylindrical portion for clamping the first shaft portion, and the first angle positioning bump is formed at a side of the cylindrical portion corresponding to the first arm portion.

9. The support mechanism of claim 7, wherein the first support rod further comprises:

a limiting portion connected to an end of the first shaft portion for preventing the first shaft portion being separate from the first clamping members.

10. The support mechanism of claim 7, wherein the first arm portion further has at least one length positioning hole, and the first support structure further comprises:

a slot member having a slot portion and an engaging portion, the first arm portion being slidably disposed in the slot portion, the engaging portion having a length positioning bump for engaging with the length positioning hole to fix a length of the slot member relative to the first support rod.

11. The support mechanism of claim 10, wherein the slot member further has a pull portion formed at an end of the engaging portion for driving the length positioning bump of the engaging portion to be separate from the length positioning hole when being pulled.

12. The support mechanism of claim 7, wherein the first clamping members are fixed to the first clamping frame by screws.

13. A computer apparatus comprising:

a computer device; and a support structure for supporting the computer device, the support structure comprising:

a clamping frame for clamping a side of the computer device;

two clamping members disposed on the clamping frame, at least one of the two clamping members having at least one angle positioning bump; and a support rod disposed at a side of the clamping frame for supporting the clamping frame, the support rod comprising:

an arm portion having an angle positioning hole for engaging with the angle positioning bump to fix an angle of the arm portion relative to the clamping frame; and a shaft portion extendedly connected to an end of the arm portion and detachably disposed between the clamping members, for making the arm portion capable of rotating relative to the clamping frame.

14. The computer apparatus of claim 13, wherein each clamping member has a cylindrical portion for clamping the shaft portion, and the angle positioning bump is formed at a side of the cylindrical portion corresponding to the arm portion.

15. The computer apparatus of claim 13, wherein the support rod further comprises:

a limiting portion connected to an end of the shaft portion for preventing the shaft portion being separate from the clamping members.

16. The computer apparatus of claim 13, wherein the arm portion further has at least one length positioning hole, and the support structure further comprises:

a slot member having a slot portion and an engaging portion, the arm portion being slidably disposed in the slot portion, the engaging portion having a length positioning bump for engaging with the length positioning hole to fix a length of the slot member relative to the support rod.

17. The computer apparatus of claim 16, wherein the slot member further has a pull portion formed at an end of the engaging portion for driving the length positioning bump of the engaging portion to be separate from the length positioning hole when being pulled.

18. The computer apparatus of claim 13, wherein the clamping members are fixed to the clamping frame by screws.

* * * * *